United States Patent [19]

Fukushima et al.

[11] 3,925,057

[45] Dec. 9, 1975

[54] PROCESS FOR RECYCLING CHLORINE GAS IN THE CHLORINATION TREATMENT OF IRON OXIDE ORES CONTAINING TITANIUM

[75] Inventors: Seitaro Fukushima, Saitama; Kiyoshi Kawahara, Tokyo, both of Japan

[73] Assignee: Mitsubishi Kinzoku Kabushiki Kaisha, Tokyo, Japan

[22] Filed: July 11, 1974

[21] Appl. No.: 487,802

[30] Foreign Application Priority Data

July 12, 1973 Japan............................... 48-78757

[52] U.S. Cl. ................................ 75/1 T; 423/149
[51] Int. Cl.$^2$ .......................................... C22B 1/00
[58] Field of Search ...................... 75/1, 25, 60, 34; 423/149/

[56] References Cited
UNITED STATES PATENTS 1,994,367   3/1935   Millar ............................... 423/149
3,375,098   3/1968   Marshall ............................. 75/34

*Primary Examiner*—Peter D. Rosenberg
*Attorney, Agent, or Firm*—Wenderoth, Lind & Ponack

[57] ABSTRACT

Process for recycling chlorine gas in the selective chlorination treatment of iron oxide ores containing titanium for the purpose of obtaining ores enriched with titanium dioxide, which comprises converting chlorine gas introduced into the chlorination treatment process of the iron oxide ores containing titanium to ferric chloride by reaction with the iron oxide contained in the ores in the chlorination process, reconverting said ferric chloride to free chlorine gas by reaction with oxygen in an oxidation process, subjecting the total quantity of the exit gases containing said free chlorine gas from the oxidation process to dust-removing and drying operations, isolating said chlorine from said exit gases in the final process, and returning the isolated chlorine to the chlorination process.

13 Claims, 3 Drawing Figures

PROCESS FOR RECYCLING CHLORINE GAS IN THE CHLORINATION TREATMENT OF IRON OXIDE ORES CONTAINING TITANIUM

BACKGROUND OF THE INVENTION

The present invention relates to processes for chlorinating iron oxide-containing ores to recover ores enriched with titanium dioxide. More specifically, the present invention is concerned with a process for recycling chlorine in the chlorination treatment of iron oxide ores containing titanium which comprises selectively chlorinating the iron content of the iron oxide ores containing titanium to vaporize it as gaseous ferric chloride and recovering ores enriched with titanium dioxide as a residue and is characterized in that the gaseous chlorine used in the chlorination reaction is regenerated, and the regenerated gaseous chlorine is repeatedly used for the subsequent chlorination reaction.

Australian Patent No. 242,474 discloses the most simple method for recycling chlorine in the chlorination treatment process for iron oxide ores containing titanium, wherein an iron oxide ore containing titanium is reacted with chlorine gas in the absence of reducing agents in the first furnace, the liberated oxygen resulting from the first reaction is reacted with ferric chloride in the second furnace to convert the ferric chloride to chlorine gas and iron oxide, and the resultant chlorine gas is returned to the first furnace. In this method, the chlorination reaction of the iron oxide ore containing titanium in the absence of reducing agents and the recovery of chlorine gas are effected by utilizing either the temperature change of reactivity between $Fe_2O_3$ and $Cl_2$ or the difference between the free energy of formation of $Fe_2O_3$ and the free energy of formation of $Fe_2TiO_5$ which is a combined product of $Fe_2O_3$ and $TiO_2$. Therefore, since these reaction steps proceed on the basis of a substantially slight change in free energy, a very high level of technique is considered to be necessary to ensure a complete reaction with chlorine.

If the reaction of the iron oxide ore containing titanium with chlorine gas is carried out in the presence of a reducing agent, oxygen liberated from the iron oxide contained in the ore combines with the reducing agent to form carbon oxides, according to the following equation (carbon being used as a reducing agent in this case). Accordingly, the subsequent oxidation process requires a further oxygen supply from another source. As a result, gaseous chlorine diluted with carbon dioxide is finally recovered.

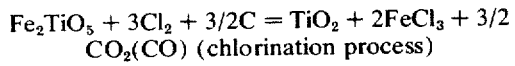

$Fe_2TiO_5 + 3Cl_2 + 3/2C = TiO_2 + 2FeCl_3 + 3/2 CO_2(CO)$ (chlorination process)

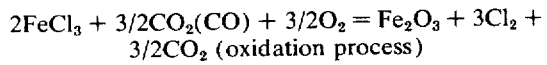

$2FeCl_3 + 3/2CO_2(CO) + 3/2O_2 = Fe_2O_3 + 3Cl_2 + 3/2CO_2$ (oxidation process)

The gaseous chlorine regenerated in the oxidation process contains, in addition to the above-mentioned carbon dioxide, unreacted oxygen and nitrogen for use in sealing at various parts of the reaction device, and a combined mixture of these gases is discharged from the oxidation process.

On the other hand, in accordance with the disclosure of Australian Patent No. 206,305, the gases issuing from the oxidation process are passed through a layer of carbon maintained white-hot to convert carbon dioxide and a small amount of unreacted oxygen mixed therein to carbon monoxide, and the resultant gaseous mixture of chlorine and carbon monoxide as a reducing agent is returned and reused as the chlorinating gas in the chlorination process. However, one molecule of carbon dioxide is converted to two molecules of carbon monoxide in the carbon layer, and inert gases such as nitrogen progressively accumulate without being treated, thereby leading to increasing amounts of the recycled gas due to repeated cycles. Therefore, the recycled gas must be partially discharged from the system at any convenient point.

British Patent No. 992,317 discloses another method of recycling chlorine wherein about 50 % of the discharge gas from the oxidation process is passed through the same carbon layer as in the process of Australian Patent No. 206,305 to convert carbon dioxide to carbon monoxide, and the resulting gaseous mixture is returned to the chlorination process, the remaining 50 % of discharge gas being liquefied to recover the chlorine contained therein, whereby the chlorine is separated from the impurities. However, since the conversion of carbon dioxide to carbon monoxide is an endothermic reaction and requires a high temperature of the order of 1,000°C, several technological problems remain to be solved in subjecting a gaseous mixture containing chlorine to such a condition and recycling the thus treated gaseous mixture to the chlorination process while suppressing loss of heat. Further, there is no concrete indication concerning the separation of the dissolved carbon dioxide from the liquefied chlorine in the liquefaction of the gaseous mixture of carbon dioxide and chlorine.

SUMMARY OF THE INVENTION

The present invention affords a solution to the problem encountered in recycling the recovered chlorine gas to a reaction process for obtaining an ore enriched with titanium dioxide by chlorinating an iron oxide ore containing titanium with chlorine gas in the presence of a reducing agent and provides a process for recycling chlorine in the chlorination treatment of an iron oxide ore containing titanium which can be carried out on an industrial scale.

In accordance with the present invention, there is provided a process for recycling chlorine in the chlorination treatment of iron oxide ores containing titanium for obtaining ores enriched with titanium dioxide which process comprises converting chlorine gas introduced into the process for chlorinating an iron oxide ore containing titanium by the reaction with iron oxide contained in the ore to ferric chloride in a chlorination process, reconverting this ferric chloride to free chlorine gas by the reaction with oxygen in an oxidation process, subjecting the total quantity of the discharge gases containing the free chlorine gas from the oxidation process to a dust separation operation followed by drying, isolating the chlorine from the carbon dioxide, nitrogen, oxygen and other gases entrained by the discharge gas, and returning the isolated chlorine to the chlorination process.

DETAILED DESCRIPTION

Figure 1:
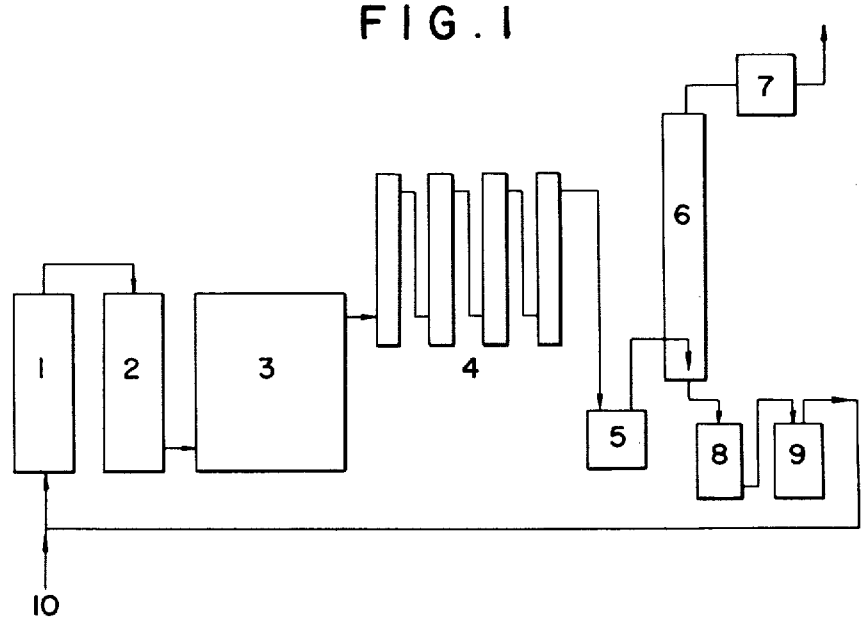
FIG. 1 is a flow chart showing the essential organization of apparatus for the practice of one example of this invention.

The apparatus shown by the flow chart of FIG. 1 comprises, essentially, a fluidized-bed type chlorination furnace 1, an oxidation furnace 2 for receiving the output of the chlorination furnace 1, a dust-removing device 3 for removing dust from the output of the oxidation furnace 2, a gas dryer 4 for drying the same output thus cleaned of dust, a compressor 5 for compressing the gas thus dried, a rectifying tower 6 receiving the gas thus compressed, a device 7 for treating exhaust gases from the upper part of the rectifying tower 6, a reservoir 8 for receiving liquefied chlorine from the bottom of the tower 6, an evaporator 9 for evaporating liquid chlorine from the reservoir 8 and recycling the vaporized chlorine to the chlorination furnace 1, and a supply line 10 for supplying chlorine to the chlorination furnace 1.

The apparatus illustrated in FIG. 1 is further provided with lines (not shown) for introducing solid process materials and taking out the products. Furthermore, the oxidation furnace 2 is provided with a line (not shown) for introducing oxygen.

Figure 2:
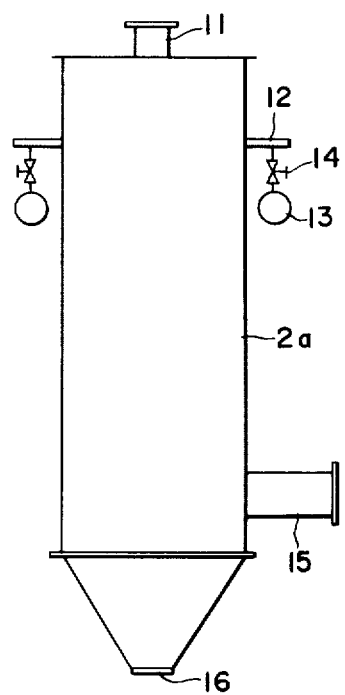
FIG. 2 is an elevation showing one example of an oxidation furnace suitable for use in the practice of this invention.
Figure 3:
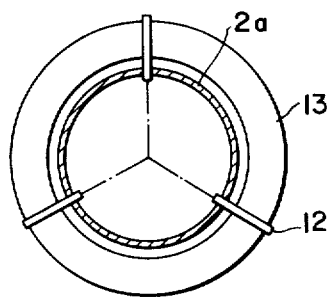
FIG. 3 is a plan view showing the positions at which nozzles for injecting oxygen or a gas containing oxygen are installed in the oxidation furnace.

One example of an oxidation furnace suitable for use in the apparatus shown in FIG. 1 is illustrated in FIG. 2, and one example of installation of nozzles for injection of oxygen or oxygen-containing gases in the oxidation furnace 2 is indicated in FIG. 3. This furnace 2 has a furnace structure 2a of cylindrical shape installed vertically and having an inlet 11 for injecting of iron chloride-containing gas positioned at the top of the furnace structure 2a, injection nozzles 12 for injecting oxygen or oxygen-containing gas positioned at equal intervals around the structure 2a at an upper part thereof and supplied with oxygen or oxygen-containing gas by a manifold or header 13, a valve 14 installed between the header 13 and each nozzle 12, a gas exhaust pipe 15, and an outlet 16 for taking out $Fe_2O_3$.

The apparatus of the organization briefly described above operates in as follows.

A fluidized-bed type chlorination furnace 1 is charged with a mixture of iron oxide ore containing titanium and a reducing agent, said reducing agent being less than 10 % by weight based on the ore. Simultaneously, chlorine gas is blown into the furnace at the bottom thereof. The chlorine gas thus blown in reacts selectively with the iron oxide contained in the ore at a temperature of 800° to 1,100°C. Ordinarily the quantity of the chlorine used is the stoichiometric quantity required to remove the iron oxide from the ore to a substantial degree of 15 % in excess of that amount. Calcined petroleum coke or coal coke may be used as a solid reducing agent. The coke is desirably in the form of a powder and should have a low impurity content.

The operation conditions of the chlorination furnace 1 and the reaction conditions therein are described in Japanese Patent Application No. 30,629/74. That is, the charged iron oxide ore is fluidizedly treated with chlorine gas at an average residence time of 200 to 400 minutes, and the treated ore is then removed from the furnace.

The gases issuing from the top of the chlorination furnace 1 consist primarily of ferric chloride gas and carbon dioxide with minor quantities of carbon monoxide, unreacted chlorine gas, sealing nitrogen gas and such other volatile chlorides as may be derived from the ore. The gaseous mixture at a temperature of 700° to 950°C is introduced into the oxidation furnace 2 into which oxygen or oxygen-containing gases are simultaneously introduced and mixed together. Thus, while the inlet temperature of the oxidation furnace is maintained at a temperature between 700° and 950°C, the outlet temperature is lowered to a temperature of 400° to 700°C since a lower temperature is preferable for the equilibrium of the oxidation. The gaseous mixture reacts together with each other resulting in chlorine gas and solid iron oxide. The oxidation furnace 2 used is of the same construction as that described in Japanese Patent Application No. 48,941/73 so that the reaction product, i.e., iron oxide, can be prevented from sticking to the inner wall surface of the furnace.

If necessary, the iron oxide ores containing titanium is pretreated in an oxygen-containing atmosphere having an oxygen vapor pressure sufficient to convert the $Fe^{2+}$ present in the ore to $Fe^{3+}$ at a temperature below the sintering temperature of the ore for 20 to 120 minutes. Also, the iron oxide ore containing titanium which has undergone the chlorination process may be subjected to a magnetic separation operation at a magnetic flux density of no less than 20,000 gauss, and, if necessary, it is further subjected to a wet treatment and/or an electrostatic separation in an electric field of 5,000 to 12,000 volts and an electrostatic separation in an electric field of 12,000 to 30,000 volt. The exit gases from the oxidation furnace 2 ordinarily have a composition consisting essentially of 40 to 60 % $Cl_2$, 20 to 40 % $CO_2$, 10 to 20% $N_2$, and unreacted oxygen and ferric chloride. These gases may be outside of the specified ranges depending upon the reaction conditions.

That is, the oxidation furnace comprises a nozzles ejecting oxygen or oxygen-containing gas in a direction and at a velocity such that the first contact of the discharge gas enriched in ferric chloride from the chlorination furnace 1 with oxygen or oxygen-containing gas is carried out in the space of the oxidation furnace and the turbulence caused by the collision between the both gases does not reach the wall of the furnace. Such an illustrative example include the oxidation furnace having a construction shown in FIG. 2 which comprises oxygen or oxygen-containing gas ejection nozzles positioned as shown in FIG. 3.

The gases discharging from the oxidation process are introduced into the dust-removing apparatus 3 composed of several stages where the fine powder of the iron oxide and a small amount of the unreacted ferric chloride suspended in these gases are removed to the extent that the content of suspended substances is below 0.1g/m$^3$, gas, which volume is measured at atmospheric pressure and room temperature. The dust-removing apparatus used in the present invention may include a conventional cyclone, bagfilter, Cottrell precipitator, and the like. Ordinarily, a multi-stage cyclone is used for economy reasons. The exit gas emerging from the dust-removing apparatus 3 are further passed through sulfuric acid drying towers 4 as a gas drying apparatus where they are dried until their dew point is reduced to a temperature of −20 to −50°C.

The gases thus dried are then introduced into a compressor 5 having of a series of 2 to 3 stages. By the compressor 5, the gases are compressed to 4 to 8 atmospheres depending upon the chlorine concentration of the gases, after which the compressed gases are blown into liquefied chlorine adjusted to a temperature of 0° to 15°C at the bottom of the rectifying tower 6. During this step, the carbon dioxide dissolved in the liquid chlorine is purged from the liquid chlorine and the gases flow upwardly through the rectifying tower 6 to a condensation region maintained at a temperature of −50° to −55°C at the upper part of the tower 6 where the chlorine gas is liquefied. The carbon dioxide, nitrogen and any other non-condensable gases contained in these gases are discharged from the top of the rectifying tower 6 and then treated in an absorbing device 7 containing an alkaline solution as a waste gas treating device.

On the other hand, the liquid chlorine accumulating in the bottom of the rectifying tower 6 is continuously or intermittently extracted and stored in the reservoire 8, from which it is continuously delivered into the evaporator 9 and caused to evaporate, and the chlorine thus evaporated is returned to the chlorination process. In addition to the sulfuric acid drying towers, silica-gel drying towers, molecular sieves drying towers and the like, may be used as the gas dryer 4 for the exit gases from the dust removing device 3.

A rectifying tower suitable for the present invention is an overall reflux type of packed tower or tray tower type having a theoretical number of plates of no less than 3 in view of carbon dioxide-chlorine equilibrium. The pressure in the tower is determined almost totally by the output pressure of the compressor, and the pressure loss in the tower is of no substantial significance. The rectifying tower 6 includes a reboiler and condenser using a conventional heat source or refrigerant.

The evaporator 9 used in the present invention may be of any indirect heat exchanger type.

Further, loss of chlorine due to the unreacted ferric chloride in the oxidation process and any other chlorine which cannot be recovered or loss of the chlorine entrained within the waste gas in the liquefaction process may be compensated by fresh chlorine supply at any suitable position in the chlorine recycle system. Ordinarily, this compensation may be suitably effected immediately before the chlorination process in a line for recovering chlorine or in another supply line separately provided in a continuous or intermittent manner. In the final process, means for separating chlorine gas from the entrained carbon dioxide, nitrogen, oxygen, and any other gases need not comprise a liquefaction method wherein compressive cooling is resorted to, and a method of selectively absorbing chlorine with the use of an organic solvent or other solvents while discharging other gases, for example, may be used. The absorbing agents suitable for use in the present invention include sulfur monochloride, carbon tetrachloride, titanium tetrachloride and chlorinated hydrocarbon solvents such as propane heptachloride.

As stated above, the present invention provides a process for recycling chlorine gas in the chlorination treatment of iron oxide ores containing titanium wherein iron oxides are removed from said ores for the purpose of obtaining ores enriched with titanium dioxide, characterized in that: the chlorine gas introduced into the chlorination treatment process is evaporated as gaseous ferric chloride; the chlorine contained in the ferric chloride gas is again isolated in the oxidation process; the total volume of the discharge gases from the oxidation furnace is subjected to the dust removing and drying operations; subsequently, the carbon dioxide, nitrogen, oxygen and any other gases entrained with the dried gases are separated from the chlorine gas in the final stage of the process; and the isolated chlorine gas is then returned to the chlorination process. The process of the present invention has the following advantages over the prior art methods. 1. A chlorine recovery system is simplified, so that the technical problems which associate with divergence of the exist gas from the oxidation furnace, e.g., the adjustment of gas flowrates and subsidiary installation as in prior methods can be eliminated. 2. The chlorine can be recovered as a high purity chlorine, so that it is easy to control the amount of the chlorine entering into the chlorination furnace. 3. The chlorine passes through the overall process as a gas or liquid without forming a solid chloride which is difficult to handle on the way, so that each process is easy to operate. 4. Chlorine is recovered in the final process, thereby almost none of the chlorine to be introduced into the chlorination furnace is lost on the way.

As stated above, the present invention makes possible the realization of the cyclic use of recovered chlorine in the chlorination treatment of iron oxide ores containing titanium on an industrially productive scale which has been difficult to practice according to the prior methods. Consequently, the present invention has high utility for industrial purposes.

In order to indicate more fully, the nature and utility of this invention, the following specific example of practice is set forth, it being understood that this example is presented as illustrative only and that it is not intended to limit the scope of the invention.

EXAMPLE

Ilmenite, occurring in Australia, consisting of 53.4 % $TiO_2$, 20.4 % FeO, 19.8 % $Fe_2O_3$, 1.6 % MnO and a small amount of the entrained substances was subjected to oxidizing roasting to convert FeO to $Fe_2O_3$. The roasted ilmenite and calcined petroleum coke ground to a size below 20 mesh (Tyler standard sieve) were continuously charged into a fluidized bed type of chlorination furnace 1 having an inner diameter of 400 mm $\phi$ at a rate of 1.2 kg/min and 96g/min, respectively, and the recovered chlorine containing 1 % $CO_2$ was introduced into the furnace at a rate of 220 l/min, which volume was measured at room temperature and atmospheric pressure, through a distributing plate disposed at the bottom of the furnace. The chlorination was carried out under the conditions consisting of a reaction temperature of 950°C, a height of the ore layer in the fluidized bed of 950 mm measured under static state and a pressure loss of the chlorine through the distributing plate and the ore layer of 6,000mm $H_2O$. The reaction mixture gas produced in the chlorination furnace 1 was introduced into the oxidation furnace 2 of the same type as shown in FIG. 2 having an inner diameter of 800 mm$\phi$ and a height of 3,700 mm through a conduit at the top of the furnace. During operation, the oxidation furnace 2 was maintained at 900°C at the reaction zone and 650°C at the outlet of gases, and oxygen pre-heated to 300°C was blown into the reaction zone at a rate of 110 l/min, which volume was measured at room temperature and atmospheric pressure. The exit gases from the oxidation furnace 2 had the composition consisting of 54.2 % $Cl_2$, 27.9 % $CO_2$, 12.1 % $N_2$, 4.6 % $O_2$ and 1.2 % $FeCl_3$. The exit gases were passed through the dust-removing apparatus 3 to reduce the suspended substances in the gases to a content of less than 0.1g per 1 $m^3$ of the gases. After the dust-removing process, the total volume of the resultant gases was passed through the drying apparatus 4 comprising one tower containing 80 % $H_2SO_4$ and three towers containing 95% $H_2SO_4$ to dehydrate the gases until the dew point of the gas became −30°C, after which it was further delivered into a mist separator (not shown). After this process, the resulting gases were pressurized to 7 atmospheres (absolute) by means of the compressor 5 in which two stage compression is effected, after which the pressurized gases were blown into liquid chlorine adjusted to 10°C contained in the bottom of the rectifying tower 6. The blown gases flowed upwardly through the Raschig ring filler while contacting with drops of liquid chlorine falling from the top in a counter-current manner and reached the condensation region maintained at a temperature of −55°C where the chlorine contained in the gases were liquefied at a liquefaction yield of about 95 %. The waste gas from the top of the rectifying tower 6 had the composition consisting of 58.0 % $CO_2$, 29.4 % $N_2$, 11.1 % $O_2$ and 1.5 % $Cl_2$. The waste gas was discharged into atmosphere through the waste gas treating apparatus 7 containing caustic soda. On the other hand, the liquefied chlorine accumulating in the bottom of the rectifying tower was intermittently extracted by means of the operation of a liquid level controller and stored in the liquid chlorine reservoire 8. From the liquid chlorine reservoire 8, the liquid chlorine was continuously introduced into the evaporator 9 to evaporate it. The gaseous chlorine thus formed was returned to the chlorination furnace 1. The vaporized chlorine contained 1 % $CO_2$. The chlorine recovered through the above-mentioned respective processes was 88 to 91 % based on the chlorine introduced into the chlorination process.

What we claim is:

1. A process for cycling chlorine gas in the selective chlorination treatment of an iron oxide ore containing titanium for the purpose of obtaining an ore enriched with titanium dioxide which comprises converting chlorine gas introduced into the chlorination treatment process of the iron oxide ore containing titanium to ferric chloride by reaction with the iron oxide contained in the ore in the chlorination process, reconverting said ferric chloride to free chlorine gas by reaction with oxygen in an oxidation process, subjecting the total quantity of the exit gases containing said free chlorine gas from the oxidation process to dust-removing and drying operations, isolating chlorine from said exit gases in a final process, and returning the isolated chlorine to the chlorination process.

2. The process according to claim 1 wherein the chlorination process is carried out in the presence of a solid carbon reducing agent selected from the group consisting of petroleum coke and coal coke, and the gases to be treated in the final process are, principally, chlorine, carbon dioxide, nitrogen and oxygen.

3. The process according to claim 2 wherein the isolation of chlorine in the final process comprises the liquefaction separation of the free chlorine in a rectifying process under pressure and the discharge of the other gases in a gaseous state.

4. The process according to claim 3 wherein the rectifying process is carried out in an overall reflux type of rectifying tower having a theoretical number of plates of not less than 3.

5. The process according to claim 4 wherein: the internal pressure within the rectifying tower is 4 to 8 atmospheres (absolute); the temperature at the reboiler part is 0 to 15°C; and the temperature of the condensation region is −50° to −55°C.

6. The process according to claim 2 wherein the isolation of chlorine in the final process comprises the selective absorption of the chlorine by solvents and the subsequent discharge of the absorbed chlorine.

7. The process according to claim 6 wherein the solvent is selected from chlorinated hydrocarbon solvents, titanium tetrachloride, carbon tetrachloride and sulfur monochloride.

8. The process according to claim 1 wherein, in the drying process, a gas to be treated in the final process which has a dew point between −20° to −50°C is obtained.

9. The process according to claim 8 wherein said drying is carried out in at least one sulfuric acid drying tower.

10. The process according to claim 1 wherein the dust-removing process reduces the suspended substances to a level below 0.1g per 1 $m^3$ of the gases, the volume being measured at room temperature and atmospheric pressure.

11. The process according to claim 2 wherein the chlorination process is carried out in a fluidized bed at a reaction temperature of 800° to 1,100°C and an average residence time of 200 to 400 minutes.

12. The process according to claim 1 wherein the oxidation process is carried out in an oxidation furnace provided with a nozzle injecting oxygen or oxygen-containing gas in a direction and at a velocity such that the first contact of the discharge gas enriched with ferric chloride from the chlorination process with oxygen or oxygen-containing gas occurs in an open space of the oxidation furnace, and the turbulence caused by the collision between the both gases does not reach the wall of the furnace.

13. The process according to claim 12 wherein the discharge gas from the chlorination process is introduced into the oxidation process at a temperature of 700° to 950°C.

* * * * *